United States Patent [19]

Merkel

[11] Patent Number: 4,563,682

[45] Date of Patent: Jan. 7, 1986

[54] SCANNING TEMPERATURE DISPLAY SYSTEM

[75] Inventor: Stephen L. Merkel, Bay Village, Ohio

[73] Assignee: Nordson Corporation, Amherst, Ohio

[21] Appl. No.: 472,321

[22] Filed: Mar. 11, 1983

[51] Int. Cl.[4] .................. G08C 15/12; G08C 19/12
[52] U.S. Cl. ..................... 340/870.13; 340/870.17; 340/825.10; 370/58
[58] Field of Search .............. 340/870.13, 825.03, 340/825.10, 365 S, 870.17; 346/33 R, 33 TP; 370/58; 374/103, 114, 139, 102

[56] References Cited

U.S. PATENT DOCUMENTS

| | | | |
|---|---|---|---|
| 3,798,624 | 3/1974 | Baxter | 340/825.1 |
| 3,974,478 | 8/1976 | Griffith | 340/825.1 |
| 4,413,175 | 11/1983 | Schilling | 374/103 |
| 4,472,793 | 9/1984 | Benjaminson | 340/870.13 |
| 4,483,631 | 11/1984 | Kydd | 340/870.17 |

*Primary Examiner*—John W. Caldwell, Sr.
*Assistant Examiner*—Michael F. Heim
*Attorney, Agent, or Firm*—Wood, Herron & Evans

[57] ABSTRACT

A scanning display system for providing a sequential display of a number of temperature signal inputs. The inputs are coupled through a multiplexer to sequentially produce single output signals, which are in turn scaled and displayed in a digital display. Some of the inputs to the multiplexer may not be used, leaving certain unused inputs which are sequentially coupled to the output of the multiplexer. The multiplexer normally advances through the inputs at a particular clocking rate, as determined by a first clocking signal, at a selected frequency. The scanning display system recognizes the coupling of an unused input to the multiplexer output and advances the multiplexer using a second, higher frequency, clocking signal until the next used input is reached. In this way, only temperature inputs for used channels are displayed in the digital temperature display. A manually operated switch is also provided to advance the multiplexer through the sequence of input temperature signals.

7 Claims, 2 Drawing Figures

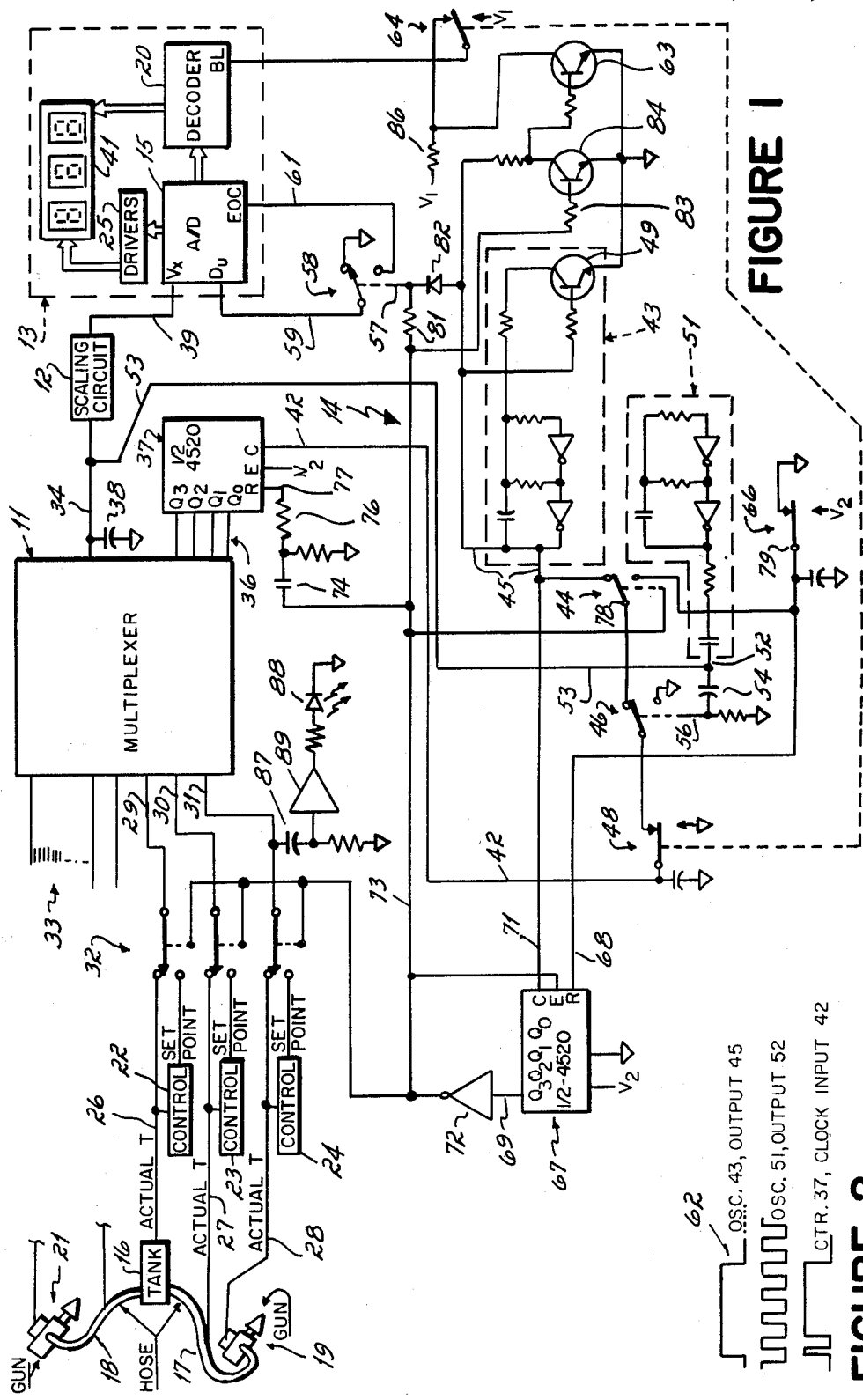

SCANNING TEMPERATURE DISPLAY SYSTEM

DESCRIPTION OF THE INVENTION

This invention is in the field of temperature display systems and more particularly concerns such systems in which a number of input temperatures are sequentially scanned and displayed.

In many types of heated systems, it is important to monitor the temperature at various locations in the system. Although in many such systems, the heating of the various elements is thermostatically controlled, it is still important for an operator to be able to observe the actual temperatures. In addition, in a thermostatically controlled heating system, it is valuable to observe the reference, or set point, temperatures used by the thermostatic controls to initialize the system or for troubleshooting.

As will be noted below with regard to an exemplary form of heated system, the invention finds advantageous use in a multi-element hot melt adhesive dispensing system. In such a system, solid adhesive is heated to a molten, fluid state and distributed to one or more dispensing guns for application to substrates of various types.

In one such hot melt adhesive dispensing system, heaters, temperature sensors, and thermostatic controls are provided for an adhesive tank, a number of adhesive-dispensing guns, and a number of hoses coupling adhesive from the tank to the guns. Additional thermostatically controlled heating circuits may also be provided for, for example, a hopper feeding adhesive to the tank or a wire grid heating element in the top of the tank.

Some hot melt adhesive systems may not have a heated hopper or grid; some systems may have a single hose and gun; some systems may have two or three hoses and guns. Providing an individual display for the temperature of each element in a multi-element system is expensive. It is therefore desirable to avoid the cost of providing individual temperature displays. One way to do this is to provide a multiplexed display, which selectively displays the temperature of one of a number of temperature sensors associated with the elements in the hot melt adhesive dispensing system. Such a multiplexed display arrangement could be individually tailored for each particular hot melt adhesive system and its number of elements. The number of inputs accommodated by the multiplexed system would be selected to correspond to the number of temperature sensors in the particular hot melt system.

This individualized approach presents the problem of a large number of customized temperature indicators for the different types of hot melt systems. If an attempt is made to merely design a multiplexed temperature display arrangement which will accept a number of temperature sensor inputs as large as the greatest number needed for any type of hot melt system, this leads to another problem. In such a large display arrangement, in most instances, the multiplexed scanning display system will have vacant inputs. In this case, the display will, as each such unused input is coupled to the display from the multiplexer, provide a false indication of an abnormal temperature, such as a very high or very low temperature. While the display circuitry, during the application of such unused inputs to the multiplexer output, could be configured to blank the display, much of the display time would be in a blanking mode rather than showing actual temperatures to the operator of the system. In addition, if the circuitry is so configured, it is difficult to accommodate the display of additional temperatures if the hot melt system served by the display circuitry is expanded or changed to a larger system.

It is, therefore, the general aim of the invention, in scanning temperature displays for systems of the foregoing type, to provide a display system which is adaptable to display a varied number of temperature inputs which are coupled to the display system at a particular time.

In carrying out the invention, there is provided a scanning display system for a plurality of temperature sensor signals which includes a multiplexer for sequentially coupling temperature sensor inputs to an output in response to clocking signals, with a first clocking signal having a first frequency which is normally coupled to the multiplexer and a second clocking signal having a higher frequency which is coupled to the multiplexer whenever an unused input is coupled by the multiplexer to its output. In this way, a display circuit coupled to the output of the multiplexer will be coupled only briefly to an unused temperature sensor input before the multiplexer output is clocked to the next sensor at a relatively high rate. This higher rate is selected so that the indication on the display of the unused input is imperceptible.

In one embodiment of the invention, there is further provided circuitry for manually advancing the multiplexer through a sequence of temperature inputs. In this case, the display system is also operable to produce a signal to couple set point temperatures, rather than sensed temperatures, to the multiplexer inputs.

Other objects and advantages of the invention, and the manner of their implementation, will become apparent upon reading the following detailed description and upon reference to the drawings, in which:

FIG. 1 is a system and circuit diagram of a hot melt adhesive dispensing system and scanning temperature display system in accordance with the present invention; and FIG. 2 is a waveform diagram showing exemplary waveforms at various points in the circuit of FIG. 1.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

Referring now to the figures, a scanning temperature display system for a hot melt adhesive dispensing arrangement includes a multiplexer circuit 11 having a number of temperature inputs coupled from the hot melt arrangement and having an output coupled through a scaling circuit 12 to display circuitry 13 for sequentially displaying the values of the temperature inputs to the multiplexer. A scanning circuit indicated generally as 14 controls the multiplexer 11 to sequentially scan the temperature inputs to couple an input to the multiplexer output, which is in turn coupled through the scaling circuit 12 to the display. The scanning circuit 14 also interfaces with the display and the temperature inputs as shall be described hereinafter.

The exemplary hot melt adhesive dispensing system includes a tank 16, a pair of hoses 17, 18 and a pair of adhesive-dispensing guns 19, 21. Each of these elements of the hot melt system is individually heated by heaters (not shown) under closed-loop thermostatic control. Exemplary controls 22, 23 and 24 for the tank 16, the hose 17 and the gun 19, respectively are illustrated. The actual temperatures of these hot melt system elements are coupled on lines 26, 27 and 28, respectively, from temperature sensors to the associated control.

Each control 22-24 includes an internal set point temperature adjustment for establishing the desired temperature for its associated hot melt dispensing system element. The control compares the actual temperature with the set point temperature in a closed control loop to activate the heater as required for that element to maintain the temperature at the set point.

Each actual temperature signal such as 26 is not only coupled to its associated control such as 22, but also serves as an input to the multiplexer 11. The actual temperature signals on the lines 26-28, for example, correspond to inputs 29-31 to the multiplexer. As shall be described in more detail hereinafter, a switching arrangement indicated generally as 32 is provided to permit switching all of the multiplexer inputs from the actual temperature signals to the set point temperature signals for each of the control circuits.

Although the signal connections for the temperature sensors for the hose 18 and the gun 21 are not illustrated, they are also coupled through the switching arrangement 32 to the multiplexer 11. In addition, other inputs may be coupled to the multiplexer as indicated generally at 33. These inputs would ordinarily be coupled through the switching arrangement 32 and might correspond, for example, to the actual and set point temperatures for a hopper or a melting grid through which hot melt adhesive is coupled to the tank 16. Or, as another example, additional hoses and guns, having associated temperature signal lines, may be provided for dispensing the adhesive from the tank 16.

Not all of the inputs 33 to the multiplexer need be coupled to a temperature output from an adhesive dispensing system element; and in fact, in many cases, there are unused inputs to the multiplexer.

The particular input to the multiplexer 11 which is coupled to its output 34 is determined by the address on a binary coded decimal bus 36 from a binary coded decimal counter 37 in the scanning circuit 14. The output 34 from the multiplexer is filtered by a capacitor 38 and coupled through a scaling circuit 12 to the display circuitry 13. The scaling circuit 12 scales the temperature signal from the hot melt system to produce a Centigrade or Fahrenheit temperature reading in the display 13.

The display circuitry 13 includes an analog-to-digital converter 15 for converting the output 39 from the scaling circuit 12 and coupled it to a binary coded decimal (BCD)-to-seven segment decoder 20 for coupling a decoded signal to a display 41. The converter 15 also controls a driver circuit 25 to drive the display 41. Since such display circuits are conventional, only the portions thereof interfacing with the scanning circuit 14 shall be discussed herein.

One of those portions is the blanking terminal of the BCD-to-seven segment decoder, which blanks the display 41 if a logic high is coupled to this terminal. The other interface point is a switch coupled to the display update terminal Du of the analog-to-digital converter 15. When this terminal is connected to a source of periodic pulses, such as is produced by the EOC output of the analog-to-digital converter, the converter updates its output to the decoder as the input to the converter changes. As shall be described hereinafter, in the scanning circuit 14, this display update terminal may be switched between circuit common (a logic low) and the EOC terminal of the converter, which applies a logic high to the display update terminal.

As indicated earlier, the BCD counter 37 advances the output of the multiplexer 11 through, for example, 16 temperature signal inputs, some of which may be unused. In order to continuously sequence the counter 37 to produce the 16 addresses on the bus 36, a series of clock signals are supplied to the counter at a clock input 42. A first oscillator circuit 43 supplies pulses at a slow rate, such as one-half hz., to the clock input 42. The pulses are supplied from an output 45 of the oscillator 43 through a switch 44, a switch 46, and a switch 48. These switches are normally in the position illustrated to permit the coupling of the oscillator output pulses to the clock input of the counter 37. The pulses are asymmetrical due to the transistor 49 in the oscillator circuit, with the pulses having a relatively short logic high portion and a relatively long logic low. As each of these pulses is received at the clock input 42 of the counter 37, the address on the output bus 36 increments by one, advancing the multiplexer to the next temperature signal, which is in turn displayed in the display 41.

In accordance with the invention, when an unused temperature signal input is coupled to the output of the multiplexer, the scanning circuit 14 is operable to skip quickly to the next used input. In order to do this, a second oscillator 51 operating at a higher rate, such as about 2000 hz., is provided. The ac coupled output 52 of the oscillator 51 is coupled to two circuit locations. First, the output 52 is coupled on a line 53 to the output 34 of the multiplexer 11. The oscillator output 52 is also coupled through a capacitor 54 to the control terminal 56 of the analog switch 46.

During normal scanning of the temperature signal inputs to the multiplexer, the high frequency oscillator output 52 is also continuously produced. When a used temperature signal input is coupled to the output 34 of the multiplexer, it presents a considerably lower impedance to the output 52 than does an unused, open circuit, input terminal. When such an unused input is coupled to the output 34 of the multiplexer, the pulse voltage coupled through the capacitor 54 to the terminal 56 increases and is sufficient to toggle the switch 46. Toggling the switch 46 couples the clock input 42 of the counter 37 to circuit common for a half cycle of the high frequency oscillator output 52. This produces a second rising edge to again clock the counter 37, advancing the multiplexer to the next temperature signal input.

In FIG. 2, one of the low frequency pulses at the oscillator output 45 is shown relative to the higher rate oscillator output 52. In the lowermost waveform of FIG. 2, the clock input 42 produced when a single unused channel is addressed is shown. The clock input 42 rises with the low frequency pulse 45, is toggled low by one higher frequency pulse, and returns high for the duration of the low frequency pulse. When the clock input rises the second time, the counter 37 is clocked to produce the next address on the bus 36, coupling the next multiplexer input to the output 34. In the case illustrated in FIG. 2, this is a used input and the toggling of the switch 46 ceases. However, the switch 46 would continue to be toggled for each unused input in sequence applied to the multiplexer until a used input is reached. The high frequency toggling of the switch 46 advances the counter 37 sufficiently rapidly that no unused input is visible on the display 41.

In order to properly update the display, the output of the low frequency oscillator 43 is also coupled to the control terminal 57 of an analog switch 58 which is coupled to the display update terminal Du of the analog-to-digital converter 15 in the display circuit 13. In the analog-to-digital converter used in one form of the circuit (a Motorola type MC14433 converter), a train of pulses at this terminal permits continued updating of the digital output as the analog input varies. When the logic high portion of the low frequency oscillator output 45 is coupled to the control terminal 57, the display update line 59 is coupled to the EOC terminal of the converter on a line 61, which applies a logic high to the display update terminal.

Each time the counter 37 is clocked by the oscillator 43, the display update is enabled on the analog-to-digital converter until the end of the logic high pulse, the transition 62 shown in FIG. 2. As can be seen from FIG. 2, the display continues to update till the end of the pulse at 62, and the additional high frequency pulses used to clock the counter 37 due to the toggling of the switch 46 have typically ended by the end of the low frequency pulse. Therefore, the output of the analog-to-digital converter is updated with a used, rather than unused, temperature signal input coupled to the output 34 of the multiplexer before the end of the update interval.

The output 45 of the low frequency oscillator 43 is also coupled to the base of a transistor 63, which is turned on during the logic high portion of the oscillator output. When the transistor 63 is turned on, its collector is at a logic low, which is coupled through a normally-closed switch 64 to the blanking terminal of the BCD to seven segment decoder in the display circuitry 13. This logic low operates to blank the display 41 for the duration of the pulse from the oscillator 43. Therefore, while the analog-to-digital converter 15 is updating, the display is blanked.

As thus far described, the scanning circuit 14 operates to sequentially display the temperature signal inputs, in use, which are coupled to the multiplexer 11 in the display 41. The unused inputs are skipped over and are substantially ignored by the display circuitry as described.

In accordance with a further object of the invention, the scanning circuit 14 further includes circuitry for displaying the set point temperatures associated with each of the elements of the hot melt adhesive dispensing system. In order to do this, a pushbutton switch 66 is operable to reset a BCD counter 67, which in turn couples the set point temperature signals to the multiplexer, resets the counter 37 which establishes the multiplexer addresses, enables the display updating, and unblanks the display. Subsequent operation of the pushbutton switch 66 advances the multiplexer address so that the set point temperatures are sequentially displayed. As before, the high frequency oscillator 51 operates to skip past unused inputs.

When the pushbutton switch 66 is depressed, a logic high is coupled to the reset input 68 of the counter 67. Resetting the counter places its four BCD outputs at a logic low. The output 69 of the counter is the highest order bit and consequently will remain at a logic low until eight clock pulses have been input on the clock input line 71 to the counter 67. The input 71 is coupled from the low frequency oscillator output 45; and therefore, the output 69 of the counter will remain low for about 16 seconds if the oscillator 43 operates at ½ hz.

The logic low at the output 69 is coupled to the input of an inverter 72, whose output 73 is then a logic high. This logic high at the output 73 is used for several purposes in the system. The time that the line 73 remains high, such as the above-mentioned exemplary 16 seconds, shall be referred to herein as the set point interval on the set point display mode inverval.

The logic high on the line 73 is coupled to the switch 32 to disconnect the multiplexer inputs from the actual temperature sensor signals and reconnect them to set point temperature signals for each of the heater control circuits such as 22–24. A set point temperature signal is an electrical signal representative of a selected desired temperature for a heater control such as 24. The signal may be taken, for example, from a terminal of a potentiometer or from a set point control voltage used in the control circuit.

Upon activation of the switch 32, each of the inputs to the multiplexer 11 which is in use is coupled to the respective set point temperature signal. Therefore, during this set point display mode, the temperatures displayed in the display 41 are set point temperatures.

When the counter 67 is reset, upon the transition of the line 73 to a logic high, a pulse is coupled through a capacitor 74 and a resistor 76 to the reset input 77 of the counter 37. This resets the address of the counter 37 to zero, the address of the first input to the multiplexer. Therefore, in the set point mode, the multiplexer output 34 begins with the first addressed temperature signal input.

During the set point display mode, the logic high on the line 73 is also coupled to the enable (E) input of the counter 67 to permit clocking of the counter by pulses from the output 45 of the low frequency oscillator 43.

The logic high on the line 73 is also coupled to the analog switch 44, disconnecting the terminal 78 of the switch from the output 45 of the low frequency oscillator and connecting it to the terminal 79 of the set point switch 66. While the logic high remains on the line 73, the terminal 78 of the switch 44 remains coupled to the terminal 79 of the set point switch 66. Subsequent depression of the set point pushbutton 66 during that interval couples another logic high pulse through the switch 44, the switch 46, and the switch 48 to the clock input of the counter 37, advancing the multiplexer to the next input. During the finite amount of time that the operator pushbutton is depressed, the high frequency oscillator 51 is operable to toggle the switch 46 to additionally clock the counter 37 past any unused input channels. This skipping of unused inputs also occurs during the initial depression of the set point pushbutton 66 so that the first input coupled to the output of the multiplexer after entering the set point mode is a used input.

The logic high on the line 73 is further coupled through a resistor 81 to the control terminal 57 of the display update analog switch 58. The logic high at this point couples the display update terminal 59 to the EOC terminal 61, to provide continuous updating of the analog-to-digital converter output. This logic high is isolated from the transistor 63 by a diode 82.

The logic high on the line 73 is also coupled through a resistor 83 to the base of a transistor 84 in order to unblank the display. The logic high at the base of the transistor 84 turns on the transistor, turning off the transistor 63. With the transistor 63 turned off, supply voltage is coupled through a resistor 86 and the switch 64 to the blanking terminal of the BCD-to-seven segment decoder. This logic high unblanks the display. In this way, each particular set point temperature coupled to the display is continuously updatable and unblanked. Therefore, for example, the set point temperature at a control such as 24 can be adjusted while an operator of the system observes the set point temperature in the display 41.

As mentioned earlier, each time the set point switch 66 is depressed during the set point display mode of operation; the counter 37 is clocked to the next used input channel to the multiplexer. At the same time, the counter 67 is reset on the line 68, beginning another set point display mode interval. It should be noted that if the counter 67 is reset during the set point display mode interval, the line 73 does not pulse high, but remains high, so that a reset pulse is not coupled through the capacitor 74 to the counter 37. This prevents the counter 37 from being reset each time the pushbutton switch 66 is depressed in the set point mode.

Once the set point interval expires, the line 73 goes to a logic low, and the switch 32 returns the multiplexer inputs to the temperature sensor signals. The logic low on the line 73 removes the enable signal from the counter 67, and it ceases to be responsive to the clock pulses at its clock input 71. The logic low on the line 73 also releases the analog switch 44 and the analog switch 58 and turns off the transistor 84. This returns the circuit to the above-described normal scanning operation.

If during scanning it is desired to stop at a particular temperature display, a scan/freeze switch 48, mechanically coupled to the switch 64, is used. Closing these two switches removes clocking pulses from the clock input 42 of the counter 37, freezing the multiplexer output. Closing the switch 64 unblanks the display so that this output is displayed continously in the display 41. Returning the switches to their original condition returns the circuit to normal operation.

In order to indicate which input of the multiplexer 11 is coupled to the output 34, and consequently displayed in the display 41, an indicator circuit is preferably associated with each of the inputs. For example, one such circuit is shown coupled to the input 31 of the multiplexer 11. As will be recalled, the high frequency oscillator output 52 is coupled through the multiplexer to each addressed input of the multiplexer.

On the input side of the multiplexer, this oscillator signal is coupled from, for example, the input 31 (when it is addressed), through a capacitor 87 and through a light-emitting diode 88, after amplification by an amplifier 89. As each input channel is addressed by the multiplexer 11, the associated light-emitting diode 88 is illuminated. This indicator circuit also serves as a substantial part of the loading for the oscillator output 52 to permit distinguishing between used and unused channels.

The supply voltages, where shown in FIG. 1, are indicated as $V_1$ and $V_2$ because different supply voltages are employed with different logic devices in the illustrated circuit. In the illustrated form of scanning display, the voltage $V_1$ is 5 volts dc and the voltage $V_2$ is 12 volts dc. The analog switch devices are triple analog three-pole, double throw switches.

What is claimed is:

1. A scanning display system for a plurality of temperature signals comprising:
   a plurality of temperature signal inputs which may include one or more unused inputs;
   a plurality of temperature set point signal inputs, each associated with a different input of the plurality of temperature signal inputs;
   multiplexing means, coupled to the temperature signal inputs and having an output, for sequentially coupling the inputs, one at a time, to the output in response to clocking signals at a clocking signal input, the multiplexing means being alternatively coupled, in a set point mode, to the temperature set point signal inputs and sequentially coupling the inputs, one at a time, to the multiplexing means output in response to clocking signals at the clocking signal input;
   means for producing a first clocking signal having a first frequency;
   means for producing a second clocking signal having a second frequency higher than said first frequency;
   means for coupling the first clocking signal to the clocking signal input of the multiplexing means;
   means, coupled to the output of the multiplexing means, for coupling the second clocking signal to the clocking signal input of the multiplexing means when an unused temperature signal input is coupled to the output of the multiplexing means;
   a display coupled to the output of the multiplexing means operable to provide a visual indication of the temperature represented by the signal at the multiplexer output;
   means for producing discrete clocking signals; and
   manually activated means for decoupling the first clocking signal from the clocking signal input of the multiplexing means, for placing the multiplexing means in a set point mode by coupling the multiplexing means to the temperature set point signal inputs, and for coupling said discrete clocking signals to the clocking signal input of the multiplexing means.

2. The system of claim 1 in which said discrete clocking signals are manually produced.

3. The system of claim 2 which further comprises timing means for deactivating the decoupling means after a preselected period of time.

4. The system of claim 3 in which the means for coupling the first clocking signal includes a switch, and the means for decoupling the first clocking signal comprises means for opening said switch.

5. The system of claim 4 in which the means for decoupling the first clocking signal includes a manually operated switch having a contact which is coupled through the switch in the means for coupling the first clocking signal, when it is opened, to the clocking signal input of the multiplexing means.

6. The system of claim 5 in which the timing means includes means for reclosing the switch in the means for coupling the first clocking signal after a preselected period of time.

7. The system of claim 6 in which the means for coupling the first clocking signal includes a second switch, and the means for coupling the second clocking signal includes means for toggling said second switch at said second clocking frequency.

* * * * *